(12) United States Patent
Tsang et al.

(10) Patent No.: US 6,198,582 B1
(45) Date of Patent: Mar. 6, 2001

(54) EFFICIENT RUN LENGTH LIMITED CODE WITH SHORT INTERLEAVED CONSTRAINT

(75) Inventors: Kinhing Paul Tsang, Plymouth; Bernardo Rub, Edina, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/330,114

(22) Filed: Jun. 10, 1999

Related U.S. Application Data
(60) Provisional application No. 60/090,546, filed on Jun. 24, 1998.

(51) Int. Cl.$^7$ .................................................... G11B 5/09
(52) U.S. Cl. .............................. 360/40; 360/53; 714/701
(58) Field of Search ................................ 360/40, 46, 53; 341/59; 714/701

(56) References Cited

U.S. PATENT DOCUMENTS

| | | |
|---|---|---|
| 5,537,112 | 7/1996 | Tsang . |
| 5,757,822 * | 5/1998 | Fisher et al. ........................ 360/40 X |

FOREIGN PATENT DOCUMENTS 0 751 522 A2   1/1997  (EP) .

OTHER PUBLICATIONS

McLaughlin S.W. et al., "Codes for Imrpoved Timing Recovery In PR4 and EPR4 Magnetic Recording", IEEE Global Telecommunications Conference, Phoenix, AZ, Nov. 3, 1997, vol. 3, pp. 1235–1239.

* cited by examiner

Primary Examiner—Alan T. Faber
(74) Attorney, Agent, or Firm—Westman, Champlin & Kelly, P.A.

(57) ABSTRACT

An encoder and a method of encoding successive data words into successive code words for transmission through a channel is provided. The encoder divides each successive data word into first and second portions. The first portion of each successive data word is mapped into a corresponding first code pattern and a corresponding state variable according to a selected code. A second portion of each successive data word is mapped into a corresponding second code pattern that is associated with the state variable, according to the selected code. The first and second code patterns are combined to form each of the successive code words. The successive code words are concatenated to form an encoded bit stream having a plurality of bit positions. The encoder imposes a run length constraint on the selected code such that the encoded bit stream has a maximum possible run of seven consecutive same binary symbols in adjacent ones of the plurality of bit positions and imposes an interleave constraint on the selected code such that the encoded bit stream has a maximum possible run of five consecutive same binary symbols in every other one of the plurality of bit positions.

14 Claims, 7 Drawing Sheets

EFFICIENT RUN LENGTH LIMITED CODE WITH SHORT INTERLEAVED CONSTRAINT

CROSS-REFERENCE TO CO-PENDING APPLICATION

This application claims the benefit of U.S. Provisional Patent Application No. 60/090,546, entitled "EFFICIENT RUN LENGTH LIMITED CODE WITH SHORT INTERLEAVED CONSTRAINT,".

Cross reference is also made to U.S. Ser. No. 09/020,874, filed Feb. 9, 1998 now U.S. Pat. No. 6,111,834, filed on Jun. 24, 1998 and entitled "DATA STORAGE SYSTEM HAVING EFFICIENT BLOCK CODE IMPLEMENTATION," which is assigned to the same assignee.

BACKGROUND OF THE INVENTION

The present invention relates to digital communications systems and, more particularly to an encoding and decoding system in a disc drive.

In the field of digital communication systems, digital information is conveyed from a transmitter to a receiver through a channel. "Channel" is a generalized term that can include many different mediums such as recording media, telephonic lines and electromagnetic spectrum. In data storage devices, such as magnetic disc drives, the channel includes a storage medium, and the digital information is transmitted to the storage medium and stored for some period of time before being recovered and delivered to the receiver.

A typical magnetic disc drive includes one or more rigid discs mounted for rotation on a hub or spindle. Each disc has an associated data head formed of a hydrodynamic bearing and a transducer, for communicating with the surface of the disc. An electromechanical actuator moves the data head radially over the disc surface for track seek operations and holds the transducer directly over a desired track on the disc surface for track following operations. A drive controller controls the disc drive based on commands received from a host system to retrieve information from the discs and to store actuator, and a "read channel" for recovering recorded data from the storage medium.

Information is typically stored in concentric data tracks on the disc surface. The direction of current through the transducer is controlled to encode magnetic flux reversals on the surface of the disc within the selected data track. In one type of coding, known as non-return-to-zero-inverse NRZI) coding, a digital "1" is represented by a magnetic flux reversal from one bit position to the next in the data track, and a digital zero is represented by a lack of a magnetic flux reversal from one bit position to the next.

In retrieving data from the disc, the drive controller controls the electromechanical actuator so that the data head flies above the desired data track, senses the flux reversals stored in the data track, and generates a read signal based on those flux reversals. The read signal is typically conditioned and then decoded by the drive controller to recover the data represented by the flux reversals.

All channels, including disc drive storage channels, introduce noise into the signals they convey. To detect and sometimes to correct signal errors caused by this channel noise, a large number of coding techniques have been developed. These coding techniques convert data words formed of a number of data bits into code words formed of a number of code bits. Coding constraints imposed on the code words permit the detection and sometimes the correction of errors in the signals received from the channel.

The average ratio of the number of data bits to the number of code bits is known as the code rate of the code. In general, the ability to detect and correct errors in a received signal increases as the code rate decreases because a lower code rate means a greater number of additional bits in the code word. However, each additional bit added by the encoder increases the time and energy needed to transmit the signal through the channel. Thus, to minimize the time and energy needed to send the code, the code rate should be minimized.

Depending on the detection scheme, the code imposes certain constraints on the code word pattern. For example, in a disc drive, the rotational speed of the spindle motor that rotates the magnetic media varies over time. This results in non-uniform time intervals between read signal voltage pulses. A phase locked loop (PLL) is used to lock the phase and frequency of the read timing clock to the phase and frequency of the read signal voltage pulses. To ensure that the PLL is updated regularly, a code can be used that limits the number of consecutive zeros to no greater than a maximum number "k". This kind of code is known as a run-length-limited (RLL) code with a "k" constraint. Smaller values of "k" ensure a greater minimum update rate for timing in the PLL. However, smaller values of "k", produce more constrained codes with a lower achievable code rate.

In a magnetic recording channel that employs Partial Response, Maximum Likelihood (PRML) signaling and uses a Viterbi detector to recover the data, another constraint "i" can also be incorporated in the code to limit delay in the Viterbi algorithm. The "i" constraint in a stream of code words represents the maximum run length of zeros in each of two interleaved sub-sequences of binary digits within the stream. One of the sub-sequences is formed by taking the odd indexed binary digits of the stream, and the other of the sub-sequences is formed by taking the even indexed binary digits of the stream. Since the "i" constraint directly affects the delay of decision in the Viterbi algorithm and also influences the length of error propagation, it is advantageous to keep the "i" constraint as short as possible.

Suppose that the sequence of binary inputs to the channel is labeled $\{c_0, c_1, c_2, \ldots \}$. The compact notation $$c(D) = \sum_{i=0}^{\infty} c_i D^i \qquad \text{Eq. 1}$$

is referred to as the "D-transform" of the input sequence which uses the unit delay operator "D", as it is known in the literature, to express that the coefficient $c_k$ of $D^k$ is the kth input to the channel. Partial response channels for magnetic recording condition the received output of the storage medium so that the sampled response of the system to an isolated input bit is given by a characteristic partial response polynomial, or "channel transfer function", P(D). Partial response channels for magnetic recording often have a partial response polynomial of the form $$P(D)=(1-D)(1+D)^n \qquad \text{Eq. 2}$$

where n is a positive integer. The D-transform of the noiseless output of the channel, v(D), is given by $$v(D)=c(D)P(D) \qquad \text{Eq. 3}$$

where the product is taken by normal polynomial multiplication.

Because of the (1−D)(1+D) factor of P(D), the channel has an all-zero response to long runs of consecutive same binary input symbols in the even and odd indexed binary sub-sequences and to long runs of consecutive alternating input symbols in the combined, global sequence. These sequences should be avoided because they contain little phase and amplitude information for closed loop control of the read channel.

One method of generating the desired channel input sequences is to use an encoder and a precoder at the input of the data channel. The encoder converts user data words that are to be stored in the channel into code words having selected constraints so that the code words avoid undesirable bit sequences. The precoder further conditions the code words and can have a transfer function of the form, $$H(D) = \frac{1}{1 \oplus D^2} \quad \text{Eq. 4}$$

where "$\oplus$" denotes an exclusive-OR operation. The encoder produces a binary coded sequence b(D) which is input to the precoder. The output of the precoder is the channel input c(D), given by $$c(D)=b(D)H(P) \quad \text{Eq. 5}$$

The conditioned code words are then provided to the channel. When the noisy output of the partial response channel is received, a detector and decoder are used to estimate the original user data.

The present invention addresses these and other problems, and offers other advantages over the prior art.

SUMMARY OF THE INVENTION

One aspect of the present invention relates to a method of encoding successive data words into successive code words for transmission through a channel is provided. Each successive data word is divided into first and second portions. The first portion of each successive data word is mapped into a corresponding first code pattern and a corresponding state variable according to a selected code. The second portion of each successive data word is mapped into a corresponding second code pattern that is associated with the state variable, according to the selected code. The first and second code patterns are combined to form each of the successive code words. The successive code words are concatenated to form an encoded bit stream having a plurality of bit positions. A run length constraint is imposed on the selected code such that the encoded bit stream has a maximum possible run of seven consecutive same binary symbols in adjacent ones of the plurality of bit positions. An interleave constraint is imposed on the selected code such that the encoded bit stream has a maximum possible run of five consecutive same binary symbols in every other one of the plurality of bit positions.

Another aspect of the present invention relates to an encoder for encoding successive data words into respective, successive code words which are concatenated to form an encoded bit stream. The encoder includes an m-bit data word input for receiving the successive data words, an n-bit code word output and first and second encoders. The first encoder includes a p-bit data word input coupled to the m-bit data word input, a u-bit code word output coupled to the n-bit code word output, and a state variable output. The second encoder includes a q-bit data word input coupled to the m-bit data word input, a v-bit code word output coupled to the n-bit code word output, and a state variable input coupled to the state variable output, where m, n, p, q, u and v are integer variables, p+q=m, u+v=n, and u<p. The first and second encoders implement a code which limits a first number of consecutive same binary symbols appearing in a sequence of adjacent bit positions within the encoded bit stream on the n-bit code word output to a maximum of seven and limits a second number of consecutive same binary symbols appearing in subsequences of even and odd indexed bit positions in the encoded bit stream on the n-bit code word output to a maximum of five.

Another aspect of the present invention relates to a disc drive storage channel which includes a transducer and a write channel. The transducer is capable of communicating with a data storage disc. The write channel is coupled to the transducer for encoding successive data words into successive code words according to a selected code to form an encoded bit stream, which is then precoded and applied the transducer as a channel input. The selected code constrains the successive code words such that there is a maximum possible run of seven consecutive same binary symbols in adjacent bit positions in the encoded bit stream and a maximum possible run of five consecutive same binary symbols in even indexed bit positions and odd indexed bit positions in the encoded bit stream.

DETAILED DESCRIPTION OF THE PREFERRED EMBODIMENTS

Figure 1:
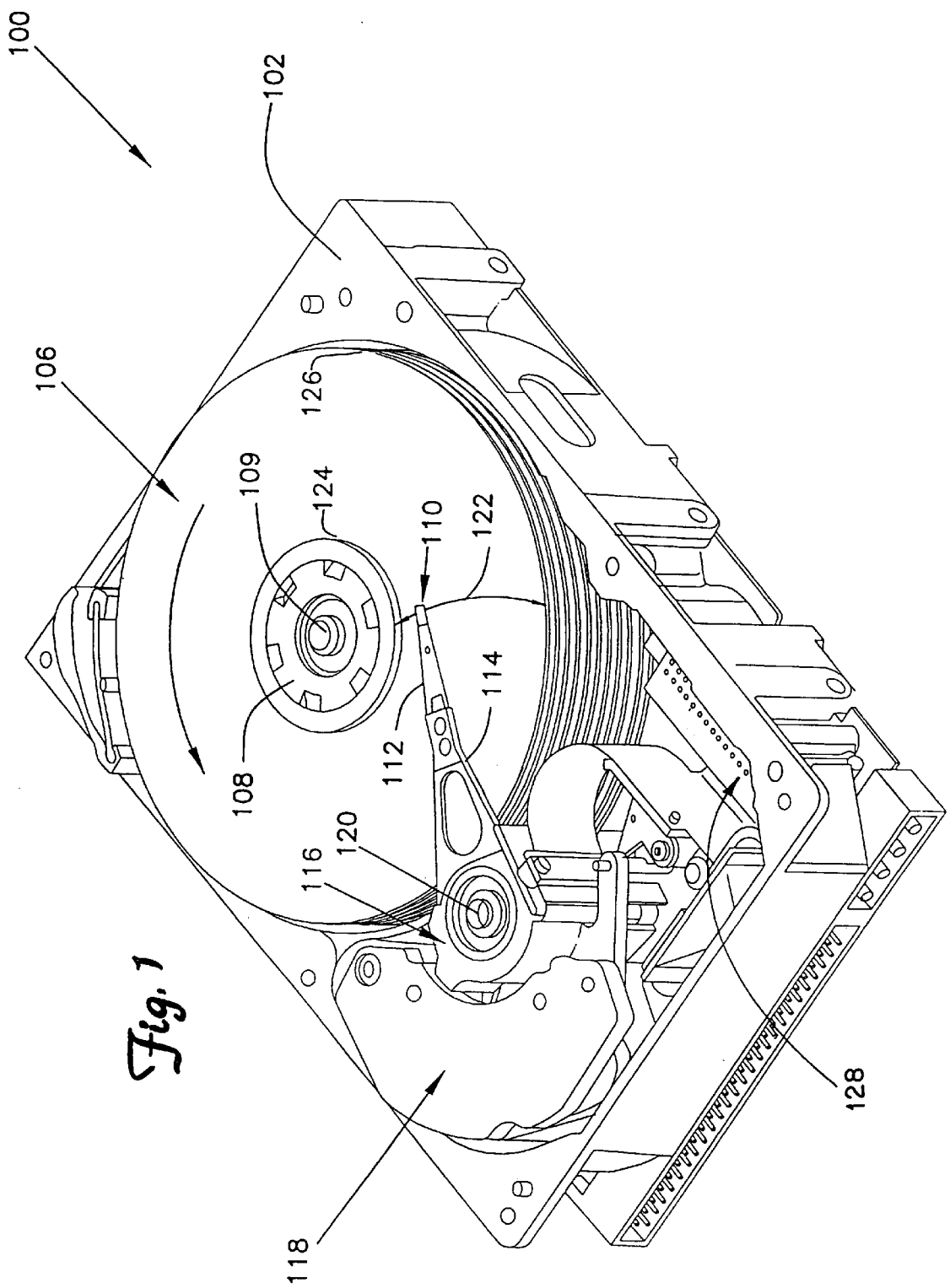
FIG. 1 is a perspective view of a disc drive in which the encoder and decoder of the present invention can be used.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs, which are mounted for co-rotation about central axis 109. Each disc surface has an associated head 110, which is mounted to disc drive 100 for communication with the disc surface. In the example shown in FIG. 1, heads 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor operates under control of internal circuitry 128.

Write circuitry within internal circuitry 128 encodes the data to be stored into successive code words and sends the code words in the form of a serial analog write signal to the write transducer on head 110 which encodes magnetic flux reversals within a magnetic layer on the disc surface. During read operations, the read transducer in head 110 senses the magnetic flux reversals and generates a serial analog read signal. The analog read signal is converted into a serial digital signal, which is provided to detector and decoder circuitry within internal circuitry 128 to produce a recovered data signal.

Figure 2:
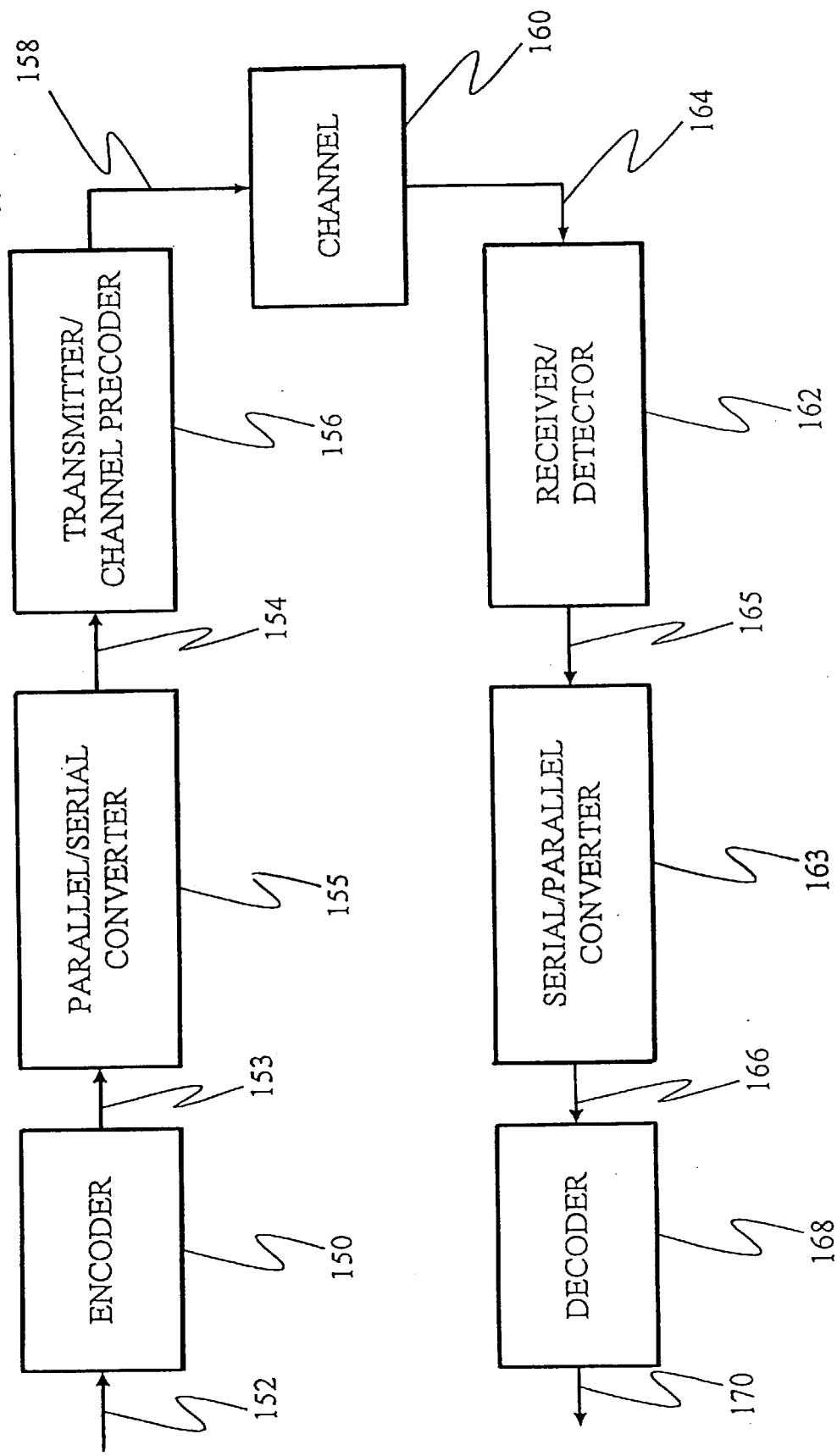
FIG. 2 is a block diagram of a generalized communication system in which the encoder and decoder can be used.

FIG. 2 is a block diagram of a generalized communication system 148 according to one embodiment of the present invention, which can be formed within disc drive 100, for example. Communication system 148 includes an encoder 150, which receives successive data words 152 and encodes the successive data words into successive code words 153. Each data word can include any number of symbols. In a binary system, for example, each symbol represents one logical data bit. In disc drive applications, common data word lengths are eight or sixteen bits. As described in more detail below, successive data words are encoded into successive code words using a Run length Limited code with "k" and "i" constraints, where the "i" constraint is as small as possible for a chosen code rate. In order to limit error propagation, each code word is formed by concatenating two shorter code words. Encoder 150 is state driven, and all code words are carefully chosen such that the state can be determined using a small number of bits, such as the leading four bits, of each code word. Encoder can be implemented with combinational logic or in software with a look-up table for making the conversion between each user data words and its corresponding code word. Other hardware and software implementations can also be used.

Parallel-to-serial converter 155 receives the successive code words 153, converts each code word into a serial representation and concatenates the serial representations to produce a serial stream of the code word bits 154. Precoder 156 receives the serial code word stream 154 and conditions the sequence so that it is optimized for the type of detector used to recover the signal from the channel. In one embodiment, precoder 156 conditions the sequence according to the polynomial given in Equation 4 above. Precoder 156 produces an encoded write signal 158, which is provided to channel 160.

In disc drive 100, channel 160 includes the write transducer in head 110, disc pack 106, and the read transducer in head 110. The encoded write signal is stored on the disc surface by the write transducer. During a read operation, the read transducer reads the stored, encoded information from the disc surface and conveys the encoded information to receiver/detector 162 as a read signal 164. Receiver/detector 162 amplifies and filters read signal 164, and then recovers the encoded information from the read signal using one of several known detection methods. For instance, receiver/detector 162 may use a Viterbi detector, Decision Feedback Equalization (DFE), Fixed-Delay Tree Search with Decision Feedback (FDTS/DF) or Reduced State Sequence detection (RSSE). After detecting and amplifying the signal from channel 160, receiver/detector 162 produces a recovered sequence of code word bits 165, which are provided to serial-to-parallel converter 163. The sequence of code word bits 165 is in a serial format at the input to serial-to-parallel converter 163.

Serial-to-parallel converter 163 groups the bits into code words and converts the code words from a serial format to a parallel format. Successively recovered code words 166 have lengths corresponding to the lengths of the code words generated by encoder 150. Serial-to-parallel converter 163 then outputs the successively recovered code words 166 in parallel format to decoder 168. Decoder 168 uses the inverse of the coding rules used by encoder 150 and converts successive code words 166 into respective data words 170.

Encoder 150 imposes several constraints on the bit patterns in code word stream 153. Since the rotational velocity of the disc can vary over time, a phase locked loop (PLL) is used to lock the phase and frequency of the read timing clock to the phase and frequency of read signal 164. To ensure that the PLL is updated regularly, encoder 150 uses a code that limits the number of consecutive zeros in code word stream 153 to no greater than a maximum number "k". This kind of code is known as a Run Length Limited (RLL) code with a global "k" or "g" constraint. Encoder 150 also limits the maximum run length of zeros in each of two interleaved sub-sequences within code word stream 153, which are formed by the odd indexed binary digits and the even indexed binary digits, respectively, in code word stream 153. This kind of code constraint is known as an interleaved "i" constraint. Since the "i" constraint directly affects the delay of decision in a Viterbi algorithm and also influences the length of error propagation, the "i" constraint is preferably kept as short as possible for a given code rate. In one example of the present invention, encoder 150 uses a 16/17 rate code with a "k" constraint of seven and an "i" constraint of five, and these constraints are enforced at all boundaries between adjacent code words.

In a RLL code of rate m/n, m-bit long data words are mapped into n-bit long code words that satisfy the selected RLL constraints, where m and n are positive integer variables. In independent block coding, $2^m$ n-bit code word patterns are required to map all the m-bit long data patterns. For example, a 16/17-rate code maps successive 16-bit data words (or two 8-bit data bytes) into successive 17-bit code words. When m and n are large, the encoder becomes very complicated and error propagation in the decoder can be severe.

Figure 3:
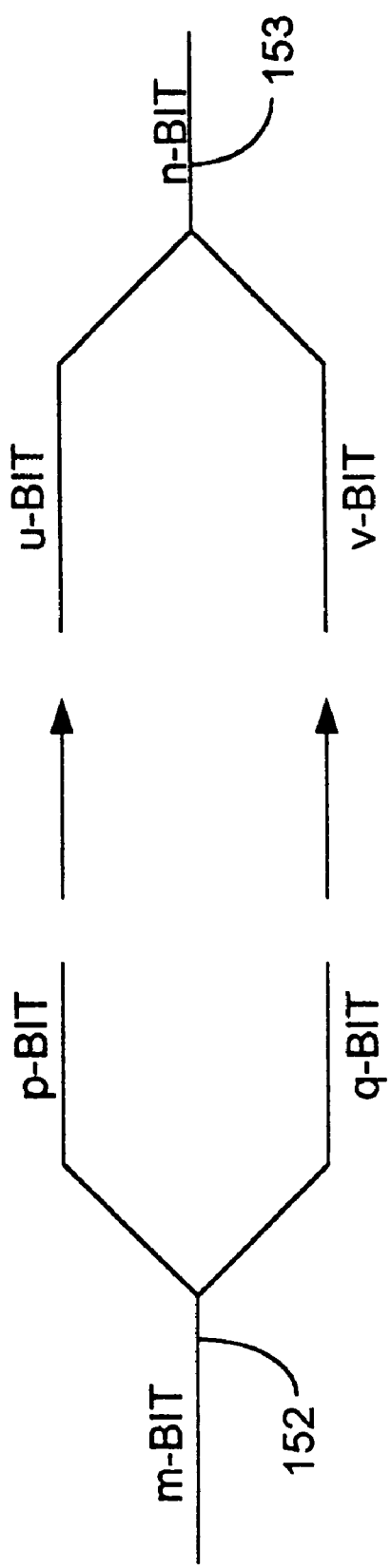
FIG. 3 is a diagram illustrating a division of input data words into respective blocks for encoding.

To overcome these problems, encoder 150 divides each m-bit data word pattern 152 into two smaller patterns, as shown in FIG. 3. The first pattern is p-bits long and the second pattern is q-bits long such that p+q=m, where p and q are positive integer variables. The p-bit long data word patterns are mapped into u-bit long code word patterns, and the q-bit long data word patterns are mapped into v-bit long code word patterns, where u and v are positive integer variables and u+v=n.

If there are $N_u$ u-bit long code patterns and $N_v$ v-bit long code patterns that satisfy the code constraints, then $N_u$ and $N_v$ are checked to see if they are sufficiently large to map all of the $2^p$ and $2^q$ data words, respectively. Since $2^p$ u-bit long code words are required to map all p-bit long data words, then Equation 6 must be satisfied, $$2^p \leq N_u \qquad \text{Eq. 6}$$

Similarly, since $2^q$ v-bit long code words are required to map all q-bit long data words, then Equation 7 must be satisfied, $$2^q \leq N_v \qquad \text{Eq. 7}$$

However, Equations 6 and 7 are not the only way to satisfy the requirement. An integer "t" may be defined such that, $$2^P \leq [N_u * t] \qquad \text{Eq. 8}$$

and $$[2^{q}*t] \leq N_v \qquad \text{Eq. 9}$$

Equations 8 and 9 are variations of Equations 6 and 7. Equations 6 and 7 are not changed individually, but are be changed together into Equations 8 and 9, for example. Equation 8 ensures each of the p-bit data patterns can be mapped to one of the u-bit code word patterns and also associates each data pattern with a state number S, where $$0, 1, \ldots, t-1 \in S. \qquad \text{Eq. 10}$$

This is a one-to-one mapping because $2^P \leq (N_u * t)$. For the q-bit data patterns, Equation 9 guarantees all $N_v$ v-bit long code words can be divided into t groups while each group includes at least $2^q$ code words. Each group can be labeled with a state number S. Within each group, each of the $2^q$ data patterns can be mapped into a unique v-bit code word.

Figure 4:
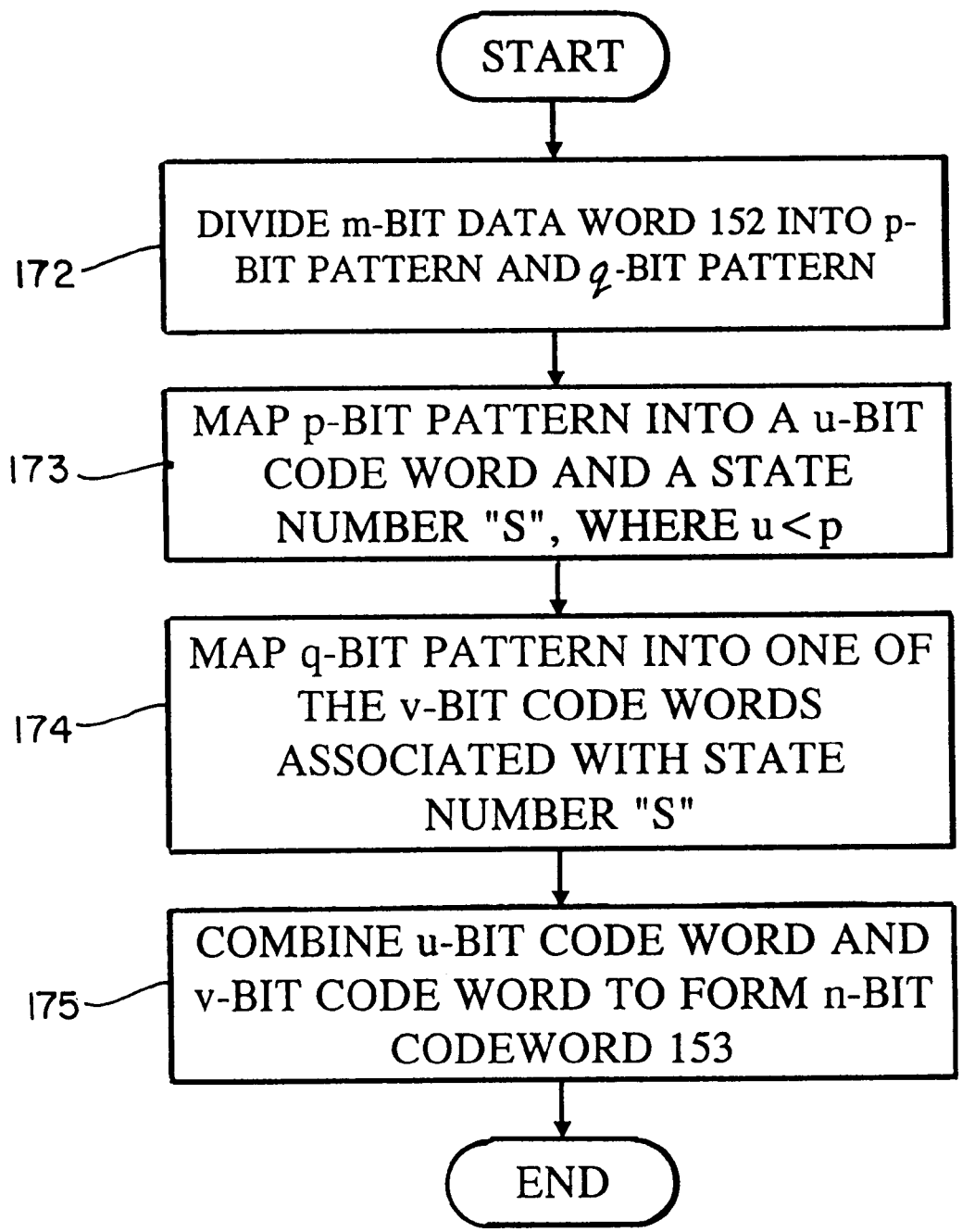
FIG. 4 is a flow chart illustrating a method of encoding according to one embodiment of the present invention.

FIG. 4 is a flow chart showing an encoding process for mapping an m-bit data word into an n-bit code word according to one embodiment of the present invention. At step 172, the m-bit data word 152 is divided into a p-bit pattern and a q-bit pattern. At step 173, the p-bit pattern is mapped into a u-bit code word and a state number S, where u<p. At step 174, the q-bit pattern is mapped into one of the v-bit code words that are associated with state number S. The u-bit and v-bit code words are combined at step 175 to form the n-bit code word 153.

Figure 5:
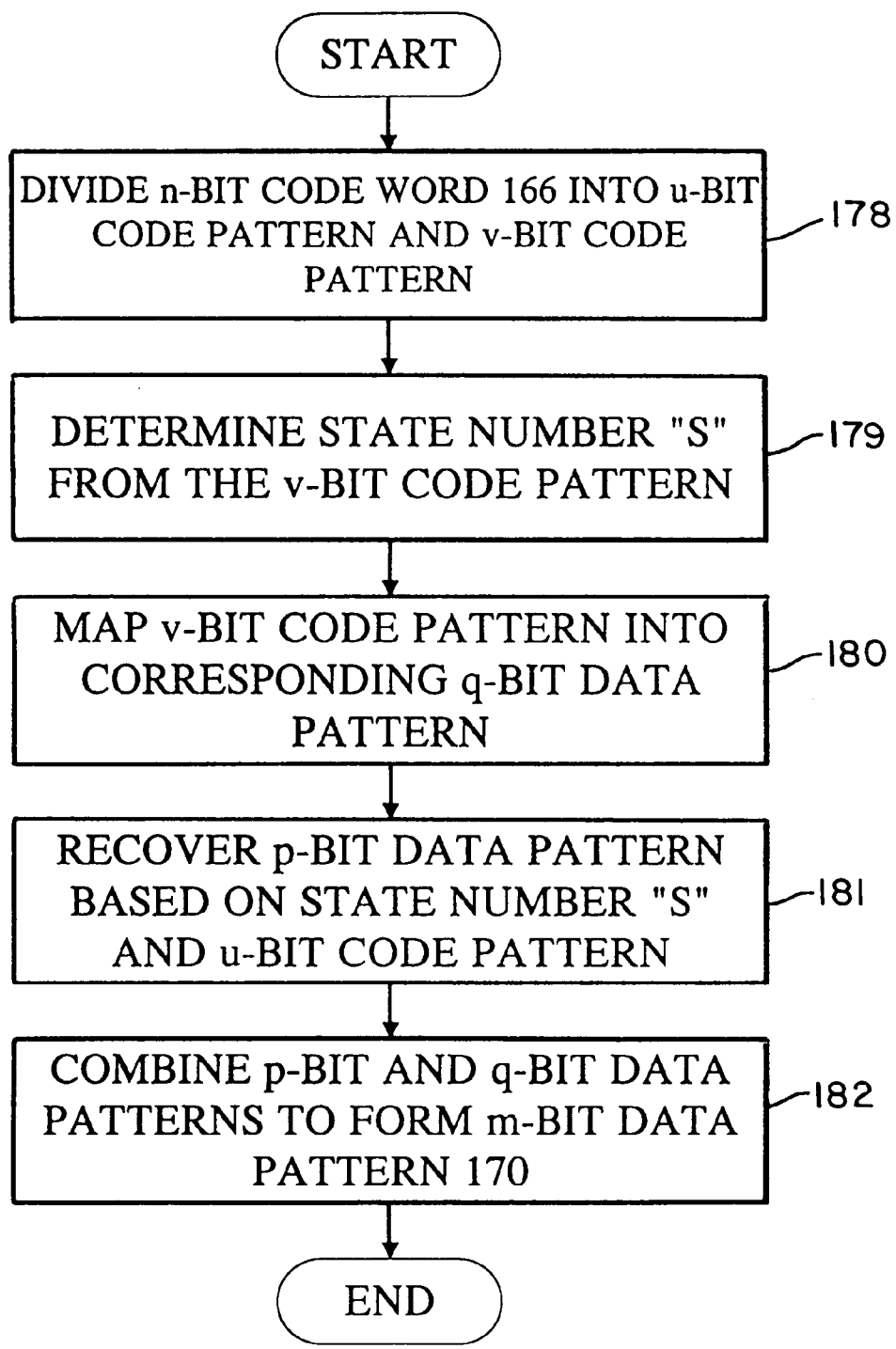
FIG. 5 is a flow chart illustrating a method of decoding according to one embodiment of the present invention.

FIG. 5 is a flow chart showing a decoding process for mapping an n-bit code word 166 into an m-bit data word 170 according to one embodiment of the present invention. At step 178, the n-bit code word 166 is divided into a u-bit code pattern and a v-bit code pattern. Since the group of v-bit patterns in each state number S is unique, the state number S for the v-bit pattern can be determined at step 179. At step 180, the v-bit code pattern is mapped into the corresponding q-bit data pattern. Based on the state number S determined in step 179, and the u-bit code word, the corresponding p-bit data pattern is recovered at step 181. At step 182, the p-bit and q-bit data patterns are combined to form the m-bit data pattern 170.

EXAMPLE

In one example, encoder 150 and decoder 168 are configured to implement a 16/17 rate RLL code, where m=16, n=17, k=7 and i=5. An efficient way to configure the encoder and decoder is to let p=8, q=8, u=7 and v=10. In satisfying the "k" and "i" constraints, there are 87 of a possible 128 7-bit code words available and 812 of a possible 1024 10-bit code words available (i.e. $N_u$=87 and $N_v$=812).

If "t" is selected to equal three, for example, then Equation 8 is satisfied, as shown in Equation 11:

$$2 = 2^8 = 256 \leq [N_u * t] = (87*3) = 261 \qquad \text{Eq. 11}$$

Also, Equation 9 is satisfied, as shown in Equation 12:

$$[2^{q}*t] = (2^8*3) = 768 \leq N_v = 812 \qquad \text{Eq. 12}$$

With t=3, there are three states, S0, S1 and S2. Since there are more than enough 10-bit code words, the 10-bit code words in each of the three states can be carefully chosen such that the state of any particular code word can be uniquely determined in step 179 of FIG. 6 by decoder 168 with as little number of bits as possible. This arrangement helps limit error propagation. Table 1 shows a grouping of 10-bit code patterns into respective states according to one example, where "X" designates a bit location having a binary value of "1" or "0".

TABLE 1

| STATE | 10-BIT CODE PATTERNS | |
|---|---|---|
| S0 | 01XXXXXXXX | 000XXXXXXX |
| S1 | 10XXXXXXXX | 0011XXXXXX |
| S2 | 11XXXXXXXX | 0010XXXXXX |

This grouping allows the state of a 10-bit code word to be uniquely determined by the four most significant bits of the code word. As long as an error burst is seven bits or less, the error of the decoded data will be confined to two consecutive data words. An 8-bit error burst, which spans the last seven bits of a 10-bit code word and the first bit of the next 7-bit code word, may cause three decoded words to be corrupted.

In one embodiment, encoder 150 generates the code words by using a state driven code table for mapping each data word pattern to a respective code word. The state driven code table is generated by collecting all the 7-bit and 10-bit patterns that satisfy the chosen constraints of k=7 and i=5. Table 2 is a state diagram, which maps each 8-bit data word D[15:8] to a corresponding 7-bit code word and next state value S0-S2 in the example provided above. The data words are provided in the columns labeled "DATA", the corresponding code words are provided in the columns labeled "CW", and the corresponding next states are provided in the columns labeled "NXS". The 8-bit data words and the 7-bit code words are each represented by two hexadecimal values.

TABLE 2

State Diagram of 7-bit code word mapping for 16/17(0,7/5) code [Min Hwt = 2]

| Data | CW | NXS |
|---|---|---|
| 00 | 0E | S0 |
| 01 | 16 | S0 |
| 02 | 26 | S0 |
| 03 | 36 | S0 |
| 04 | 46 | S0 |
| 05 | 56 | S0 |
| 06 | 66 | S0 |
| 07 | 76 | S0 |
| 08 | 0C | S0 |
| 09 | 18 | S0 |
| 0A | 0D | S0 |
| 0B | 1A | S0 |
| 0C | 0C | S1 |
| 0D | 0D | S1 |
| 0E | 0E | S1 |
| 0F | 0F | S1 |

TABLE 2-continued

State Diagram of 7-bit code word mapping for 16/17(0,7/5) code [Min Hwt = 2]

| Data | CW | NXS |
|---|---|---|
| 10 | 1E | S0 |
| 11 | 24 | S0 |
| 12 | 12 | S1 |
| 13 | 13 | S1 |
| 14 | 19 | S0 |
| 15 | 18 | S0 |
| 16 | 16 | S1 |
| 17 | 17 | S1 |
| 18 | 18 | S1 |
| 19 | 19 | S1 |
| 1A | 1A | S1 |
| 1B | 1B | S1 |
| 1C | 1C | S1 |
| 1D | 1D | S1 |
| 1E | 1E | S1 |
| 1F | 1F | S1 |
| 20 | 2E | S0 |
| 21 | 34 | S0 |
| 22 | 32 | S0 |
| 23 | 12 | S0 |
| 24 | 24 | S1 |
| 25 | 25 | S1 |
| 26 | 26 | S1 |
| 27 | 27 | S1 |
| 28 | 1C | S0 |
| 29 | 38 | S0 |
| 2A | 1D | S0 |
| 2B | 3A | S0 |
| 2C | 2C | S1 |
| 2D | 2D | S1 |
| 2E | 2E | S1 |
| 2F | 2F | S1 |
| 30 | 3E | S0 |
| 31 | 31 | S1 |
| 32 | 32 | S1 |
| 33 | 33 | S1 |
| 34 | 34 | S1 |
| 35 | 35 | S1 |
| 36 | 36 | S1 |
| 37 | 37 | S1 |
| 38 | 38 | S1 |
| 39 | 39 | S1 |
| 3A | 3A | S1 |
| 3B | 3B | S1 |
| 3C | 3C | S1 |
| 3D | 3D | S1 |
| 3E | 3E | S1 |
| 3F | 3F | S1 |
| 40 | 4E | S0 |
| 41 | 64 | S0 |
| 42 | 52 | S0 |
| 43 | 43 | S1 |
| 44 | 49 | S0 |
| 45 | 4B | S0 |
| 46 | 46 | S1 |
| 47 | 47 | S1 |
| 48 | 2C | S0 |
| 49 | 49 | S1 |
| 4A | 2D | S0 |
| 4B | 4B | S1 |
| 4C | 4C | S1 |
| 4D | 4D | S1 |
| 4E | 4E | S1 |
| 4F | 4F | S1 |
| 50 | 5E | S0 |
| 51 | 74 | S0 |
| 52 | 52 | S1 |
| 53 | 53 | S1 |
| 54 | 59 | S0 |
| 55 | 5B | S0 |
| 56 | 56 | S1 |
| 57 | 57 | S1 |
| 58 | S1 | 98 |
| 59 | 59 | S1 |
| 5A | 5A | S1 |
| 5B | 5B | S1 |
| 5C | 5C | S1 |
| 5D | 5D | S1 |
| 5E | 5E | S1 |
| 5F | 5F | S1 |
| 60 | 6E | S0 |
| 61 | 61 | S1 |
| 62 | 72 | S0 |
| 63 | 63 | S1 |
| 64 | 64 | S1 |
| 65 | 65 | S1 |
| 66 | 66 | S1 |
| 67 | 67 | S1 |
| 68 | 3C | S0 |
| 69 | 69 | S1 |
| 6A | 3D | S0 |
| 6B | 6B | S1 |
| 6C | 6C | S1 |
| 6D | 6D | S1 |
| 6E | 6E | S1 |
| 6F | 6F | S1 |
| 70 | 7E | S0 |
| 71 | 71 | S1 |
| 72 | 72 | S1 |
| 73 | 73 | S1 |
| 74 | 74 | S1 |
| 75 | 75 | S1 |
| 76 | 76 | S1 |
| 77 | 77 | S1 |
| 78 | 78 | S1 |
| 79 | 79 | S1 |
| 7A | 7A | S1 |
| 7B | 7B | S1 |
| 7C | 7C | S1 |
| 7D | 7D | S1 |
| 7E | 7E | S1 |
| 7F | 7F | S1 |
| 80 | CF | S0 |
| 81 | 17 | S0 |
| 82 | 27 | S0 |
| 83 | 37 | S0 |
| 84 | 47 | S0 |
| 85 | 57 | S0 |
| 86 | 67 | S0 |
| 87 | 77 | S0 |
| 88 | 4C | S0 |
| 89 | 58 | S0 |
| 8A | 4D | S0 |
| 8B | 5A | S0 |
| 8C | 0C | S2 |
| 8D | 0D | S2 |
| 8E | 0E | S2 |
| 8F | 0F | S2 |
| 90 | 1F | S0 |
| 91 | 25 | S0 |
| 92 | 12 | S2 |
| 93 | 13 | S2 |
| 94 | 39 | S0 |
| 95 | 3B | S0 |
| 96 | 16 | S2 |
| 97 | 17 | S2 |
| 98 | S2 | D8 |
| 99 | 19 | S2 |
| 9A | 1A | S2 |
| 9B | 1B | S2 |
| 9C | 1C | S2 |
| 9D | 1D | S2 |
| 9E | 1E | S2 |
| 9F | 1F | S2 |
| A0 | 2F | S0 |

TABLE 2-continued

State Diagram of 7-bit code word mapping for 16/17(0,7/5) code [Min Hwt = 2]

| Data | CW | NXS |
|---|---|---|
| A1 | 35 | S0 |
| A2 | 33 | S0 |
| A3 | 13 | S0 |
| A4 | 24 | S2 |
| A5 | 25 | S2 |
| A6 | 26 | S2 |
| A7 | 27 | S2 |
| A8 | 5C | S0 |
| A9 | 78 | S0 |
| AA | 5D | S0 |
| AB | 7A | S0 |
| AC | 2C | S2 |
| AD | 2D | S2 |
| AE | 2E | S2 |
| AF | 2F | S2 |
| B0 | 3F | S0 |
| B1 | 31 | S2 |
| B2 | 32 | S2 |
| B3 | 33 | S2 |
| B4 | 34 | S2 |
| B5 | 35 | S2 |
| B6 | 36 | S2 |
| B7 | 37 | S2 |
| B8 | 38 | S2 |
| B9 | 39 | S2 |
| BA | 3A | S2 |
| BB | 3B | S2 |
| BC | 3C | S2 |
| BD | 3D | S2 |
| BE | 3E | S2 |
| BF | 3F | S2 |
| C0 | 4F | S0 |
| C1 | 65 | S0 |
| C2 | 53 | S0 |
| C3 | 43 | S2 |
| C4 | 69 | S0 |
| C5 | 6B | S0 |
| C6 | 46 | S2 |
| C7 | 47 | S2 |
| C8 | 6C | S0 |
| C9 | 49 | S2 |
| CA | 6D | S0 |
| CB | 4B | S2 |
| CC | 4C | S2 |
| CD | 4D | S2 |
| CE | 4E | S2 |
| CF | 4F | S2 |
| D0 | 5F | S0 |
| D1 | 75 | S0 |
| D2 | 52 | S2 |
| D3 | 53 | S2 |
| D4 | 79 | S0 |
| D5 | 7B | S0 |
| D6 | 56 | S2 |
| D7 | 57 | S2 |
| D8 | 58 | S2 |
| D9 | 59 | S2 |
| DA | 5A | S2 |
| DB | 5B | S2 |
| DC | 5C | S2 |
| DD | 5D | S2 |
| DE | 5E | S2 |
| DF | 5F | S2 |
| E0 | 6F | S0 |
| E1 | 61 | S2 |
| E2 | 73 | S0 |
| E3 | 63 | S2 |
| E4 | 64 | S2 |
| E5 | 65 | S2 |
| E6 | 66 | S2 |
| E7 | 67 | S2 |
| E8 | 7C | S0 |
| E9 | 69 | S2 |
| EA | 7E | S0 |
| EB | 6B | S2 |
| EC | 6C | S2 |
| ED | 6D | S2 |
| EE | 6E | S2 |
| EF | 6F | S2 |
| F0 | 7F | S0 |
| F1 | 71 | S2 |
| F2 | 72 | S2 |
| F3 | 73 | S2 |
| F4 | 74 | S2 |
| F5 | 75 | 52 |
| F6 | 76 | S2 |
| F7 | 77 | S2 |
| F8 | 78 | S2 |
| F9 | 79 | S2 |
| FA | 7A | S2 |
| FB | 7B | S2 |
| FC | 7C | S2 |
| FD | 7D | S2 |
| FE | 7E | S2 |
| FF | 7F | S2 |

Tables 3–5 are state diagrams which map each 8-bit data word D[7:0] to a corresponding 10-bit code word for states S0, S1 and S2, respectively. For each data word D[7:0], either Table 3, 4 or 5 is used, depending on the state number associated with D[15:8] which is determined in Table 2.

The 8-bit data words are listed in the left column of Tables 3–5 with two hexadecimal digits, such as "0X". The second digit "X" can have the hexadecimal values 0–F, which are listed along the top row of the tables. Therefore, an 8-bit data word "0B" would be mapped into a 10-bit code word "10B", where the "1" in "10B" is translated into a two-bit binary value. And the "0" and "B" are each translated into four-bit binary values. The code words in each state S0-S2 are unique. Therefore, when decoding the code words, the corresponding state can be determined by determining the table in which the code word resides.

TABLE 3

State S0 of 10-bit code words for 16/17(0,7/5) code

|    | 0   | 1   | 2   | 3   | 4   | 5   | 6   | 7   | 8   | 9   | A   | B   | C   | D   | E   | F   |
|----|-----|-----|-----|-----|-----|-----|-----|-----|-----|-----|-----|-----|-----|-----|-----|-----|
| 0X | 06F | 034 | 04C | 03C | 078 | 079 | 058 | 059 | 070 | 109 | 071 | 10B | 10C | 10D | 10E | 10F |
| 1X | 06E | 035 | 049 | 03D | 07A | 07B | 05A | 05B | 118 | 119 | 11A | 11B | 11C | 11D | 11E | 11F |
| 2X | 06D | 121 | 04D | 123 | 124 | 125 | 126 | 127 | 072 | 129 | 073 | 12B | 12C | 12D | 12E | 12F |
| 3X | 130 | 131 | 132 | 133 | 134 | 135 | 136 | 137 | 138 | 139 | 13A | 13B | 13C | 13D | 13E | 13F |
| 4X | 06B | 036 | 04A | 03E | 07C | 07D | 05C | 05D | 148 | 149 | 14A | 14B | 14C | 14D | 14E | 14F |
| 5X | 06A | 037 | 04B | 03F | 07E | 07F | 05E | 05F | 158 | 159 | 15A | 15B | 15C | 15D | 15E | 15F |
| 6X | 069 | 161 | 162 | 163 | 164 | 165 | 166 | 167 | 168 | 169 | 16A | 16B | 16C | 16D | 16E | 16F |
| 7X | 170 | 171 | 172 | 173 | 174 | 175 | 176 | 177 | 178 | 179 | 17A | 17B | 17C | 17D | 17E | 17F |
| 8X | 067 | 181 | 04E | 183 | 184 | 185 | 186 | 187 | 074 | 189 | 075 | 18B | 18C | 18D | 18E | 18F |
| 9X | 190 | 191 | 192 | 193 | 194 | 195 | 196 | 197 | 198 | 199 | 19A | 19B | 19C | 19D | 19E | 19F |
| AX | 065 | 1A1 | 04F | 1A3 | 1A4 | 1A5 | 1A6 | 1A7 | 076 | 1A9 | 077 | 1AB | 1AC | 1AD | 1AE | 1AF |
| BX | 1B0 | 1B1 | 1B2 | 1B3 | 1B4 | 1B5 | 1B6 | 1B7 | 1B8 | 1B9 | 1BA | 1BB | 1BC | 1BD | 1BE | 1BF |
| CX | 063 | 1C1 | 1C2 | 1C3 | 1C4 | 1C5 | 1C6 | 1C7 | 1C8 | 1C9 | 1CA | 1CB | 1CC | 1CD | 1CE | 1CF |
| DX | 1D0 | 1D1 | 1D2 | 1D3 | 1D4 | 1D5 | 1D6 | 1D7 | 1D8 | 1D9 | 1DA | 1DB | 1DC | 1DD | 1DE | 1DF |
| EX | 061 | 1E1 | 1E2 | 1E3 | 1E4 | 1E5 | 1E6 | 1E7 | 1E8 | 1E9 | 1EA | 1EB | 1EC | 1ED | 1EE | 1EF |
| FX | 1F0 | 1F1 | 1F2 | 1F3 | 1F4 | 1F5 | 1F6 | 1F7 | 1F8 | 1F9 | 1FA | 1FB | 1FC | 1FD | 1FE | 1FF |

TABLE 4

State S1 of 10-bit code words for 16117(0,7/5) code

|    | 0   | 1   | 2   | 3   | 4   | 5   | 6   | 7   | 8   | 9   | A   | B   | C   | D   | E   | F   |
|----|-----|-----|-----|-----|-----|-----|-----|-----|-----|-----|-----|-----|-----|-----|-----|-----|
| 0X | 0EF | 0C4 | 0CC | 0DC | 0F8 | 0F9 | 206 | 207 | 0F0 | 0D0 | 0F1 | 0D1 | 20C | 20D | 20E | 20F |
| 1X | 0EE | 0C5 | 212 | 213 | 0FA | 0FB | 216 | 217 | 218 | 219 | 21A | 21B | 21C | 21D | 21E | 21F |
| 2X | 0ED | 0C1 | 0CD | 0DD | 224 | 225 | 226 | 227 | 0F2 | 0D2 | 0F3 | 0D3 | 22C | 22D | 22E | 22F |
| 3X | 230 | 231 | 232 | 233 | 234 | 235 | 236 | 237 | 238 | 239 | 23A | 23B | 23C | 23D | 23E | 23F |
| 4X | 0EB | 0C6 | 242 | 243 | 0FC | 0FD | 246 | 247 | 248 | 249 | 24A | 24B | 24C | 24D | 24E | 24F |
| SX | 0EA | 0C7 | 252 | 253 | 0FE | 0FF | 256 | 257 | 258 | 259 | 25A | 25B | 25C | 25D | 25E | 25F |
| 6X | 0E9 | 261 | 262 | 263 | 264 | 265 | 266 | 267 | 268 | 269 | 26A | 26B | 26C | 26D | 26E | 26F |
| 7X | 270 | 271 | 272 | 273 | 274 | 275 | 276 | 277 | 278 | 279 | 27A | 27B | 27C | 27D | 27E | 27F |
| 8X | 0E7 | 0C2 | 0CE | 0DE | 284 | 285 | 2S6 | 287 | 0F4 | 0D4 | 0F5 | 0D5 | 28C | 28D | 28E | 28F |
| 9X | 290 | 291 | 292 | 293 | 294 | 295 | 296 | 297 | 298 | 299 | 29A | 29B | 29C | 29D | 29E | 29F |
| AX | 0E5 | 0C3 | 0CF | 0DF | 2A4 | 2A5 | 2A6 | 2A7 | 0F6 | 0D6 | 0F7 | 0D7 | 2AC | 2AD | 2AE | 2AF |
| BX | 2B0 | 2B1 | 2B2 | 2B3 | 2B4 | 2B5 | 2B6 | 2B7 | 2B8 | 2B9 | 2BA | 2BB | 2BC | 2BD | 2BE | 2BF |
| CX | 0E3 | 2C1 | 2C2 | 2C3 | 2C4 | 2C5 | 2C6 | 2C7 | 2C8 | 2C9 | 2CA | 2CB | 2CC | 2CD | 20E | 2CF |
| DX | 2D0 | 2D1 | 2D2 | 2D3 | 2D4 | 2D5 | 2D6 | 2D7 | 2D8 | 2D9 | 2DA | 2DB | 2DC | 2DD | 2DE | 2DF |
| EX | 0E1 | 2E1 | 2E2 | 2E3 | 2E4 | 2E5 | 2E6 | 2E7 | 2E8 | 2E9 | 2EA | 2EB | 2EC | 2ED | 2EE | 2EF |
| FX | 2F0 | 2F1 | 2F2 | 2F3 | 2F4 | 2F5 | 2F6 | 2F7 | 2F8 | 2F9 | 2FA | 2FB | 2FC | 2FD | 2FE | 2FF |

TABLE 5

State S2 of 10-bit code words for 16/17(0,7/5) code

|    | 0   | 1   | 2   | 3   | 4   | 5   | 6   | 7   | 8   | 9   | A   | B   | C   | D   | E   | F   |
|----|-----|-----|-----|-----|-----|-----|-----|-----|-----|-----|-----|-----|-----|-----|-----|-----|
| 0X | 09F | 0A4 | 08C | 303 | 0B8 | 0B9 | 306 | 307 | 0B0 | 309 | 0B1 | 30B | 30C | 30D | 30E | 30F |
| 1X | 09E | 0A5 | 312 | 313 | 0BA | 0BB | 316 | 317 | 318 | 319 | 31A | 31B | 31C | 31D | 31E | 31F |
| 2X | 09D | 321 | 08D | 323 | 324 | 325 | 326 | 327 | 0B2 | 329 | 0B3 | 32B | 32C | 32D | 32E | 32F |
| 3X | 330 | 331 | 332 | 333 | 334 | 335 | 336 | 337 | 338 | 339 | 33A | 33B | 33C | 33D | 33E | 33F |
| 4X | 09B | 0A6 | 342 | 343 | 0BC | 0BD | 346 | 347 | 348 | 349 | 34A | 34B | 34C | 34D | 34E | 34F |
| 5X | 09A | 0A7 | 352 | 353 | 0BE | 0BF | 356 | 357 | 358 | 359 | 35A | 35B | 35C | 35D | 35E | 35F |
| 6X | 099 | 361 | 362 | 363 | 364 | 365 | 366 | 367 | 368 | 369 | 36A | 36B | 36C | 36D | 36E | 36F |
| 7X | 370 | 371 | 372 | 373 | 374 | 375 | 376 | 377 | 378 | 379 | 37A | 37B | 37C | 37D | 37E | 37F |
| 8X | 097 | 381 | 08E | 383 | 384 | 385 | 386 | 387 | 0B4 | 389 | 0B5 | 38B | 38C | 38D | 38E | 38F |
| 9X | 390 | 391 | 392 | 393 | 394 | 395 | 396 | 397 | 398 | 399 | 39A | 39B | 39C | 39D | 39E | 39F |
| AX | 095 | 3A1 | 08F | 3A3 | 3A4 | 3A5 | 3A6 | 3A7 | 0B6 | 3A9 | 0B7 | 3AB | 3AC | 3AD | 3AE | 3AF |
| BX | 3B0 | 3B1 | 3B2 | 3B3 | 3B4 | 3B5 | 3B6 | 3B7 | 3B8 | 3B9 | 3BA | 3BB | 3BC | 3BD | 3BE | 3BF |
| CX | 093 | 3C1 | 3C2 | 3C3 | 3C4 | 3C5 | 3C6 | 3C7 | 3C8 | 3C9 | 3CA | 3CB | 3CC | 3CD | 3CE | 3CF |
| DX | 3D0 | 3D1 | 3D2 | 3D3 | 3D4 | 3D5 | 3D6 | 3D7 | 3D8 | 3D9 | 3DA | 3DB | 3DC | 3DD | 3DE | 3DF |
| EX | 091 | 3E1 | 3E2 | 3E3 | 3E4 | 3E5 | 3E6 | 3E7 | 3E8 | 3E9 | 3EA | 3EB | 3EC | 3ED | 3EE | 3EF |
| FX | 3F0 | 3F1 | 3F2 | 3F3 | 3F4 | 3F5 | 3F6 | 3F7 | 3F8 | 3F9 | 3FA | 3FB | 3FC | 3FD | 3FE | 3FF |

Figure 6:
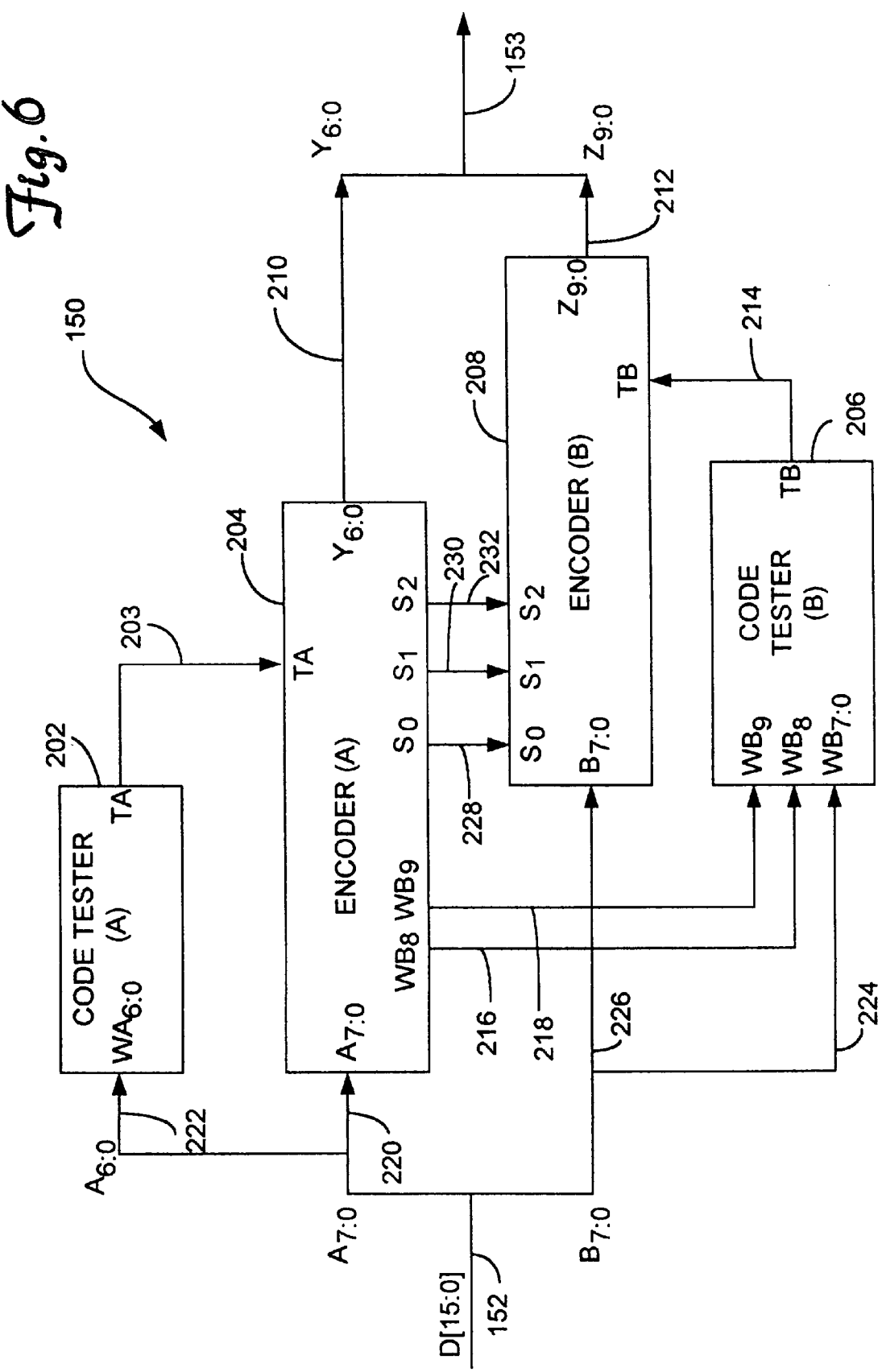
FIG. 6 is a block diagram of an encoder according to one embodiment of the present invention.

FIG. 6 is a block diagram illustrating encoder 150 for producing a 16/17 rate code with a global run length constraint "k" of 7 and an interleave constraint "i" of 5. Encoder 150 is divided into two parts, part A and part B. Part A includes code tester (A) 202 and encoder (A) 204, and part B includes code tester (B) 206 and encoder (B) 208.

Encoder (A) 204 receives the eight most significant bits D[15:8] of a 16-bit input data word D[15:0] along input bus 220. These eight bits are denoted as $A_{7:0}$ in encoder (A) 204, which is shorthand for a string of eight bits: $A_7 A_6 A_5 A_4 A_3 A_2 A_1 A_0$.

Of the eight bits received by encoder (A) 204, code tester (A) 202 receives the least significant 7 bits, denoted as $WA_{6:0}$ in code tester (A) 202, along bus 222.

Code tester (A) 202 produces output TA 203 which is input to encoder (A) 204. Based on TA 203 and inputs $A_{7:0}$, encoder (A) 204 produces a 7-bit code word $Y_{6:0}$ on output bus 210. Encoder (A) 204 also produces three state variables $S_0$, $S_1$ and $S_2$ and two part B bits $WB_8$ and $WB_9$. One of the state variables $S_0$, $S_1$ or $S_2$ is active, depending on the next state associated with the 7-bit code word $Y_{6:0}$, determined by Table 2.

Part B bits $WB_8$ and $WB_9$ are input to code tester (B) 206, along lines 216 and 218, respectively. Code tester (B) 206 also receives the least significant eight bits D[7:0] of the input data word along input data bus 224. These bits are denoted as input bits $WB_{7:0}$ in code tester (B) 206. Based on inputs $WB_{7:0}$, $WB_8$ and $WB_9$, code tester (B) 206 produces an output TB 214 which is input to encoder (B) 208.

In addition to receiving TB 214, encoder (B) 208 receives state variables $S_0$, $S_1$ and $S_2$ along lines 228, 230 and 232, respectively, and the least significant eight bits D[7:0] of the input data word along input bus 226. Within encoder (B) 208, the least significant eight bits of the input data word are denoted as $B_{7:0}$. Based upon all of the input values, encoder (B) 208 produces ten output code bits $Z_{9:0}$ along output bus 212. These bits are concatenated to bits $Y_{6:0}$ to form a 17-bit code word output.

Encoder 150 can be implemented in combinational logic. This combinational logic can be described in the tables below using the following symbols:

"|" represents a bitwise OR;
"&" represents a bitwise AND;
"+" represents an arithmetic sum;
"^" represents XOR; and
"!X" represents the inverse of X.

In addition, in the following tables, the subscript numbering notation is replaced by a single script notation. Thus, $S_0$ is represented as S0, $B_1$ is represented as B1 and so forth.

Code tester (A) 202 produces output TA 203 based upon inputs $WA_{6:0}$ using the equations in Table 6:

TABLE 6

7-bit codeword tester (A) BOOLEAN EQUATIONS
Inputs: WA6,WA5,WA4,WA3,WA2,WA1,WA0 (7 bits)
Output: TA
UA0 = WA6 | WA5 | WA4 | WA3
UA1 = WA3 | WA2 | WA1 | WA0
UA2 = WA6 | WA4 | WA2
UA3 = WA5 | WA3 | WA1
UA4 = WA4 | WA2 | WA0
TA = UA0 & UA1 & UA2 & UA3 & UA4

Encoder (A) 204 produces output 210 ($Y_{6:0}$) using input bits $A_{7:0}$ and TA 203 and the Boolean equations shown in Table 7 below.

TABLE 7

7-bit Encoder (A) BOOLEAN EQUEATIONS
Input: A7,A6,A5,A4,A3,A2,A1,A0 (8-bit Dataword)
Input: TA (From CT-A)
Output: Y6,Y5,Y4,Y3,Y2,Y1,Y0 (7-bit Codeword)

TABLE 7-continued

Output: S2,S1,S0 (To ENC-B)
Output: WB9,WB8 (To CT-B)
NA0 =!A3&!A2&!A1&!A0
NA1 =!A3&!A2&!A1& A0
NA23 =!A3&!A2& A1
NA45 =!A3& A2&!A1
Ga = NA0
Ga6= Ga& A6
Ga5= Ga& A5
Ga4= Ga& A4
Ga3= Ga
Ga2= Ga
Ga1= Ga
Ga0= Ga & A7
Gb = !(A6|A5|A4|A3|NA0)
Gb6= Gb & A2
Gb5= Gb & A1
Gb4= Gb & A0
Gb2= Gb
Gb1= Gb
Gb0= Gb & A7
Gc= !TA & A3
Gc6= Gc & A7
Gc5= Gc&( A6|( A5& A0))
Gc4= Gc&( A5 | A0)
Gc3= Gc
Gc2= Gc & !A0
Gc1= Gc &( A1 & A0)
Gc0= Gc &( A1 &!A0)
Gd= !TA & NA45 & !Gb
Gd6= Gd & A6
Gd5= Gd & A7
Gd4= Gd & A4
Gd3= Gd
Gd1= Gd & A0
Gd0= Gd
Ge= !TA & NA1 & !Gb
Ge6= Ge & A6
Ge5= Ge
Ge4= Ge &( A6^ !A4)
Ge2= Ge
Ge0= Ge & A7
Gf= !TA & NA23 & !Gb
Gf6= Gf & A6
Gf5= Gf &( A5 & !A0)
Gf4= Gf
Gf1= Gf
Gf0= Gf & A7
Y6 = (TA&A6)|(!TA&( Ga6|Gb6|Gc6|Gd6|Ge6|Gf6))
Y5 = (TA&A5)|(!TA&( Ga5|Gb5|Gc5|Gd5|Ge5|Gf5))
Y4 = (TA&A4)|(!TA&( Ga4|Gb4|Gc4|Gd4|Ge4|Gf4))
Y3 = (TA&A3)|(!TA&( Ga3|Gc3|Gd3))
Y2 = (TA&A2)|(!TA&( Ga2|Gb2|Gc2|Ge2))
Y1 = (TA&A1)|(!TA&( Ga1|Gb1|Gc1|Gd1|Gf1))
Y0 = (TA&A0)|(!TA&( Ga0|Gb0|Gc0|Gd0|Ge0|Gf0))
S2 = A7 & TA
S1 = !A7 & TA
S0 = !TA
WB9 = S2|S1
WB8 = S2|S0

Code tester (B) 206 produces output TB 214 using input bits $WB_{7:0}$ of the input data word, bits $WB_8$ and $WB_9$ from encoder (A) 204 and the Boolean equations shown in Table 8.

TABLE 8

10-bit codeword tester (B) BOOLEAN EQUATIONS
Input: WB9,WB8,WB7,WB6,WB5,WB4,WB3,WB2,WB1,WB0 (10 bits)
Output: TB
UB0 = WB9 | WB8 | WB7 | WB6 | WB5
UB1 = WB4 | WB3 | WB2 | WB1 | WB0
UB2 = WB9 | WB7 | WB5 | WB3
UB3 = WB8 | WB6 | WB4 | WB2
UB4 = WB7 | WB5 | WB3 | WB1

TABLE 8-continued

UB5 = WB6 | WB4 | WB2 | WB0
TB = UB0 & UB1 & UB2 & UB3 & UB4 & UB5

Encoder (B) 208 produces output bits 212 ($Z_{9:0}$) using the least significant 8 bits of the input data word ($B_{7:0}$), the three state variables $S_0$, $S_1$ and $S_2$, TB 214 and the Boolean equations shown in Table 9.

TABLE 9

10-bit Encoder (B) BOOLEAN EQUEATIONS
Input: B7,B6,B5,B4,B3,B2,B1,B0 (8-bit Dataword)
Input: S2,S1,S0 (From ENC-A)
Input: Th (From CT-B)
Output: Z9,Z8,Z7,Z6,Z5,Z4,Z3,Z2,Z1,Z0 (10-bit Codeword)
NA0 =!B3&|B2&|B1&|B0
NA1 =!B3&|B2&|B1& B0
NA2 =!B3&|B2& B1&|B0
NA3 =!B3&|B2& B1& B0
Ha = B3
Ha7= Ha & (S1|S2)
Ha6= Ha & (S1|S0)
Ha5= Ha & !B0
Ha4= Ha
Ha2= Ha & B7
Ha1= Ha & B5
Ha0= Ha & B1
Hb = !B3 & B2
Hb7= Hb & (S1|S2)
Hb6= Hb & (S1|S0)
Hb5= Hb & !B1
Hb4= Hb
Hb3= Hb
Hb2= Hb & B6
Hb1= Hb & B4
Hb0= Hb & B0
Hc = NA0
Hc7= Hc & (S1|S2)
Hc6= Hc & (S1|S0)
Hc5= Hc & (S1|S0)
Hc4= Hc & S2
Hc3= Hc & !B7
Hc2= Hc & !B6
Hc1= Hc & !B5
Hc0= Hc & !B4
Hd = NA2 | (S1&NA3)
Hd7= Hd & (S1|S2)
Hd6= Hd & (S1|S0)
Hd4= Hd & B0
Hd3= Hd
Hd2= Hd &( !B6 & !B4)
Hd1= Hd &( B7 | B6)
Hd0= Hd &( B5 | B4)
He = NA1 | (S0&NA3)
He7= He & (S1|S2)
He6= He & S1
He5= He & (S0|S2)
He4= He & S0
He3= He & B1
He2= He &(!B7 & |B5)
He1= He &( B7 | B6)
He0= He &( B5 | B4)
Z9 = (TB&(S2|S1))
Z8 = (TB&(S2|S0))
Z7 = (TB&B7)|(!TB&( Ha7|Hb7|Hc7|Hd7|He7))
Z6 = (TB&B6)|(!TB&( Ha6|Hb6|Hc6|Hd6|He6))
Z5 = (TB&B5)|(!TB&( Ha5|Hb5|Hc5|He5))
Z4 = (TB&B4)|(!TB&( Ha4|Hb4|Hc4|Hd4|He4))
Z3 = (TB&B3)|(!TB&( Hb3|Hc3|Hd3|He3))
Z2 = (TB&B2)|(!TB&( Ha2|Hb2|Hc2|Hd2|He2))
Z1 = (TB&B1)|(!TB&( Ha1|Hb1|Hc1|Hd1|He1))
Z0 = (TB&B0)|(!TB&( Ha0|Hb0|Hc0|Hd0|He0))

Figure 7:
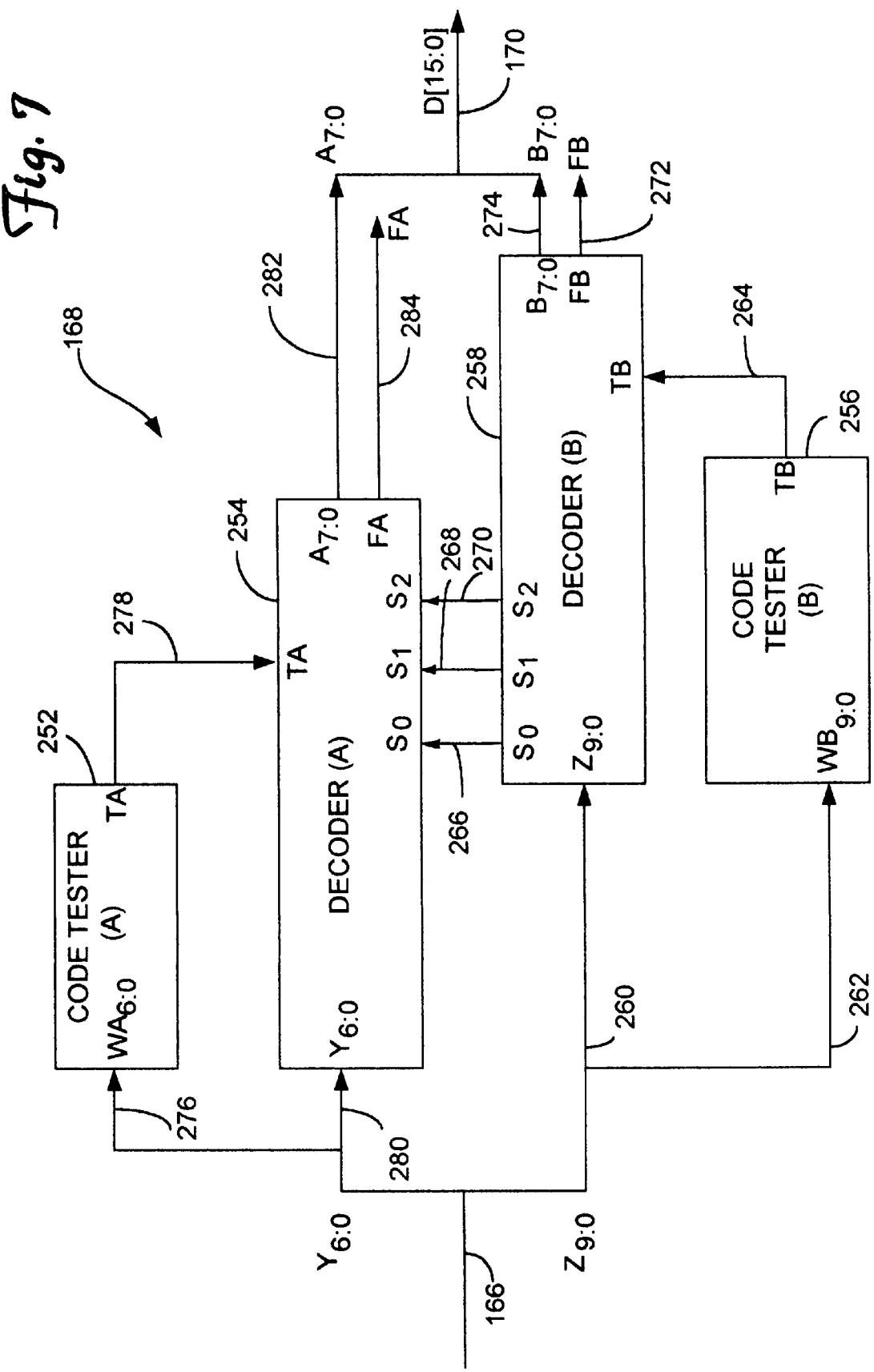
FIG. 7 is a block diagram of a decoder according to one embodiment of the present invention.

FIG. 7 is a block diagram of decoder 168 for decoding the codewords produced by encoder 150, according to one embodiment of the present invention. Decoder 168 includes a part A and a part B, where part A includes code tester (A) 252 and decoder (A) 254, and part B includes code tester (B) 256 and decoder (B) 258.

The least significant 10 bits of each codeword ($Z_{9:0}$) are input to part B of decoder 168 along input bus 260. Code tester (B) 256 receives the same 10 code bits along input bus 262, but denotes the 10 bits as $WB_{9:0}$. Code tester (B) 256 uses these input bits to produce output TB 264 using the Boolean equations provided in Table 8 above. Thus, code tester (B) 256 contains the same combinational logic as code tester (B) 206 of FIG. 6. The code tester circuit 206 may be shared by encoder 150 and decoder 168.

Output TB 264 is input to decoder (B) 258 along with the ten least significant bits of the codeword ($Z_{9:0}$). Decoder (B) 258 uses these inputs to produce state outputs $S_0$, $S_1$ and $S_2$, along lines 266, 268 and 270, respectively, invalid codeword indicator FB on line 272, and the eight least significant bits ($B_{7:0}$) of the recovered data word along output bus 274. Invalid codeword indicator FB is simply the inverse of TB 264. State variables $S_0$, $S_1$ and $S_2$ and recovered data bits $B_{7:0}$ are produced using the Boolean equations shown in Table 10.

TABLE 10

10-bit Decoder (DEC-B) BOOLEAN EQUATIONS
Input: Z9,Z8,Z7,Z6,Z5,Z4,Z3,Z2,Z1,Z0 (10-bit Codeword)
Input: TB (From CT-B)
Output: B7,B6,B5,B4,B3,B2,B1,B0 (8-bit Dataword)
Output: S2,S1,S0 (To ENC-B)
Output: FB (invalid Codeword indicator)
Ha = ( ((Z7|Z6)&Z5)|( Z7&Z6) )&Z4&!Z3
Hb = ( ((Z7|Z6)&Z5)|(!Z7&Z6) )&Z4& Z3
Hc = (Z6&Z5&!Z4) | (Z7&!Z6&!Z5&Z4)
Hd = ( ((Z7|Z6)&!Z4)|( Z7&Z6) )&!Z5&Z3
He = (!Z6&Z5&Z2&(Z7^Z4)) | (Z7&Z6&!Z5&!Z4&!Z3)
Ha7= Ha & Z2
Ha5= Ha & Z1
Ha3= Ha
Ha1= Ha & Z0
Ha0= Ha & !Z5
Hb6= Hb & Z2
Hb4= Hb& Z1
Hb2= Hb
Hb1= Hb & !Z5
Hb0= Hb & Z0
Hc7= Hc & !Z3
Hc6= Hc & !Z2
Hc5= Hc & !Z1
Hc4= Hc & !Z0
Hd7= Hd &( Z2 & Z1)
Hd6= Hd &( Z1 & !Z2)
Hd5= Hd &( Z2 & Z0)
Hd4= Hd &( Z0 & !Z2)
Hd1= Hd
Hd0= Hd&Z4
He7= He &( Z1 & !Z2)
He6= He &( Z2 & Z1)
He5= He &( Z0 & ! Z2)
He4= He &( Z2 & Z0)
He1= He&Z3
He0= He
ZZ = !Z9 & !Z8
S2 = ( Z9 & Z8) | (ZZ&Z7&!Z6)
S1 = ( Z9 & !Z8) | (ZZ&Z7& Z6)
S0 = (!Z9 & Z8) | (ZZ& !Z7)
B7 = (!ZZ&Z7) | (ZZ&(Ha7|Hc7|Hd7|He7))
B6 = (!ZZ&Z6) | (ZZ&(Hb6|Hc6|Hd6|He6))
B5 = (!ZZ&Z5) | (ZZ&(Ha5|Hc5|Hd5|He5))
B4 = (!ZZ&Z4) | (ZZ&(Hb4|Hc4|Hd4|He4))
B3 = (!ZZ&Z3) | (ZZ&(Ha3))
B2 = (!ZZ&Z2) | (ZZ&(Hb2))
B1 = (!ZZ&Z1) | (ZZ&(Ha1|Hb1|Hd1|He1))

TABLE 10-continued

B0 = (!ZZ&Z0) | (ZZ&(Ha0|Hb0|Hd0|He0))
PB = (Ha|Hb|Hc|Hd|He)
FB = (!TB) | (ZZ & !PB)

Code tester (A) 252 receives the seven most significant bits of the codeword, which are represented as $WA_{6:0}$ in code tester (A) 252, along input bus 276. Code tester (A) 252 uses the Boolean equations shown in Table 6 above together with the input bits to produce output TA 278, which is provided to decoder (A) 254. Thus, code tester (A) 252 contains the same combinational logic as code tester (A) 202 of FIG. 6.

Decoder (A) 254 also receives the most significant seven bits $Y_{6:0}$ of the codeword along input bus 280 and state variables $S_0$, $S_1$ and $S_2$ from decoder (B) 258 along lines 266, 268, and 270, respectively. Decoder (A) 254 uses these input values to produce the eight most significant bits $(A_{7:0})$ of the recovered data word and an invalid codeword indicator FA along output bus 282 and line 284, respectively. Invalid codeword indicator FA is simply the inverse of TA 278 from code tester (A) 252. Recovered data bits $A_{7:0}$ are determined using the Boolean equations shown in Table 11.

TABLE 11

7-bit Decoder (A) BOOLEAN EQUATIONS

| | |
|---|---|
| Input: Y6,Y5,Y4,Y3,Y2,Y1,Y0 | (7-bit Codeword) |
| Input: TA | (From CT-A) |
| Input: S2,S1,S0 | (From DEC-B) |
| Output: A7,A6,A5,A4,A3,A2,A1,A0 | (8-bit Dataword) |
| Output: FA | (invalid codeword indicator) |

Ga = Y3& Y2& Y1
Gb =!Y3& Y2& Y1
Gc = Y3&( (Y2&!Y1)|(!Y2&!Y0))
Gd = Y3&!Y2& Y0
Ge =!Y3& Y2&!Y1
Gf =!Y3&!Y2& Y1&Y4
Ga7= Ga & Y0
Ga6= Ga & Y6
Ga5= Ga & Y5
Ga4= Ga & Y4
Gb7= Gb & Y0
Gb2= Gb & Y6
Gb1= Gb & Y5
Gb0= Gb & Y4
Gc7= Gc & Y6
Gc6= Gc &( Y5& Y2)
Gc5= Gc&( Y4 &( Y5 | Y2))
Gc3= Gc
Gc1= Gc &( Y1 | Y0)
Gc0= Gc & !Y2
Gd7= Gd & Y5
Gd6= Gd & Y6
Gd4= Gd & Y4
Gd2= Gd
Gd0= Gd & Y1
Ge7= Ge & Y0
Ge6= Ge & Y6
Ge5= Ge &( Y4 & !Y6)
Ge4= Ge &( Y6 !Y4)
Ge0= Ge
Gf7= Gf& Y0
Gf6= Gf& Y6
Gf5= Gf&( Y5 | !Y6)
Gf1= Gf
Gf0= Gf &( !Y6 & !Y5)
S12= S1 | S2
A7 = S2 | (S0&(Ga7|Gb7|Gc7|Gd7|Ge7|Gf7))
A6 = (S12&Y6) | (S0&(Ga6|Gc6|Gd6|Ge6|Gf6))
A5 = (S12&Y5) | (S0&(Ga5|Gc5|Ge5|Gf5))
A4 = (S12&Y4) | (S0&(Ga4|Gd4|Ge4))
A3 = (S12&Y3) | (S0&(Gc3))
A2 = (S12&Y2) | (S0&(Gb2|Gd2))
A1 = (S12&Y1) | (S0&(Gb1|Gc1|Gf1))

TABLE 11-continued

A0 = (S12&Y0) | (S0&(Gb0|Gc0|Gd0|Ge0|Gf0))
PP = (Ga|Gb|Gc|Gd|Ge|Gf)
FA = (!TA) | (S0 & !PP)

In summary, one aspect of the present invention provides a method of encoding successive data words 152 into successive code words 153 for transmission through a channel 160 is provided. Each successive data word 152 is divided into first and second portions $A_{7:0}$ and $B_{7:0}$. The first portion $A_{7:0}$ of each successive data word 152 is mapped into a corresponding first code pattern $Y_{6:0}$ and a corresponding state variable $S_0$-$S_2$ according to a selected code. The second portion $B_{7:0}$ of each successive data word 152 is mapped into a corresponding second code pattern $Z_{9:0}$ that is associated with the state variable $S_0$-$S_2$, according to the selected code. The first and second code patterns $Y_{6:0}$ and $Z_{9:0}$ are combined to form each of the successive code words 153. The successive code words 153 are concatenated to form an encoded bit stream having a plurality of bit positions. A run length constraint "k" is imposed on the selected code such that the encoded bit stream has a maximum possible run of seven consecutive same binary symbols in adjacent ones of the plurality of bit positions. An interleave constraint "i" is imposed on the selected code such that the encoded bit stream has a maximum possible run of five consecutive same binary symbols in every other one of the plurality of bit positions.

Another aspect of the present invention relates to an encoder 150 for encoding successive data words 152 into respective, successive code words 153 which are concatenated to form an encoded bit stream. The encoder 150 includes an m-bit data word input ($A_{7:0}$, $B_{7:0}$) for receiving the successive data words 152, an n-bit code word output ($Y_{6:0}$, $Z_{9:0}$) and first and second encoders 204 and 208. The first encoder 204 includes a p-bit data word input $A_{7:0}$ coupled to the m-bit data word input, a u-bit code word output $Y_{6:0}$ coupled to the n-bit code word output, and a state variable output $S_0$-$S_2$. The second encoder 208 includes a q-bit data word input $B_{7:0}$ coupled to the m-bit data word input, a v-bit code word output $Z_{9:0}$ coupled to the n-bit code word output, and a state variable input coupled to the state variable output, where m, n, p, q, u and v are integer variables, p+q=m, u+v=n, and u<p. The first and second encoders 204 and 208 implement a code which limits a first number of consecutive same binary symbols appearing in a sequence of adjacent bit positions within the encoded bit stream 153 on the n-bit code word output to a maximum of seven and limits a second number of consecutive same binary symbols appearing in subsequences of even and odd indexed bit positions in the encoded bit stream 153 on the n-bit code word output to a maximum of five.

Another aspect of the present invention relates to a disc drive storage channel 148 which includes a transducer 110 and a write channel 150, 155 and 156. The transducer 110 is capable of communicating with a data storage disc 106. The write channel 150, 155 and 156 is coupled to the transducer 110 for encoding successive data words 152 into successive code words 153 according to a selected code to form an encoded bit stream 154, which is then precoded and applied the transducer 110 as a channel input 158. The selected code constrains the successive code words 153 such that there is a maximum possible run of seven consecutive same binary symbols in adjacent bit positions in the encoded bit stream and a maximum possible run of five consecutive same binary symbols in even indexed bit positions and odd indexed bit positions in the encoded bit stream 154.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the coding method and apparatus while maintaining substantially the same functionality without departing from the scope and spirit of the present invention. In addition, although the preferred embodiment described herein is directed to a coding system for a disc drive, it will be appreciated by those skilled in the art that the teachings of the present invention can be applied to other systems, like satellite communications or cellular phone systems, without departing from the scope and spirit of the present invention. Various other codes may also be used, more than one encoding or decoding table may be linked together, additional or different state numbers may be used, the data provided to the encoders or decoders may be partitioned or may overlap as desired, etc.

What is claimed is:

1. A method of encoding successive data words into successive code words for transmission through a channel, the method comprising steps of:

(a) dividing each successive data word into first and second portions;

(b) mapping the first portion of each successive data word into a corresponding first code pattern and a corresponding state variable according to a selected code;

(c) mapping a second portion of each successive data word into a corresponding second code pattern that is associated with the state variable according to the selected code;

(d) combining the first and second code patterns to form each of the successive code words;

(e) concatenating the successive code words to form an encoded bit stream having a plurality of bit positions; and (f) imposing a run length constraint on the selected code such that the encoded bit stream has a maximum possible run of seven consecutive same binary symbols in adjacent ones of the plurality of bit positions and an interleave constraint on the selected code such that the encoded bit stream has a maximum possible run of five consecutive same binary symbols in every other one of the plurality of bit positions.

2. The method of claim 1 wherein:

the successive data words each include m bits, where m is an integer;

the successive code words each include n bits, where n is an integer and $$n = m + 1;$$

the dividing step (a) comprises dividing each successive data word into a corresponding first, p-bit portion and a second, q-bit portion, where p and q are integer variables;

the mapping step (b) comprises mapping the first, p-bit portion into a first, u-bit code pattern, where u is an integer variable and u<p; and the mapping step (c) comprises mapping the second, q-bit portion into a second, v-bit code pattern that is associated with the state variable.

3. The method of claim 2 wherein m=16, n=17, p=8, q=8, u=7 and v=10.

4. The method of claim 2 and further comprising steps:

(g) defining a plurality of v-bit code patterns and dividing the plurality of v-bit code patterns into a plurality of sets;

(h) associating each of the plurality of sets with one of a plurality of state values, wherein the corresponding state variable in the mapping step (b) has one of the plurality of state values and wherein the second, q-bit portion is mapped into one of the plurality of v-bit code patterns in the set that is associated with the state value of step (b).

5. The method of claim 4 wherein v=10 and wherein:

the defining step (g) comprises dividing the plurality of v-bit code patterns into first, second and third sets; and the associating step (h) comprises associating the first, second and third sets with first, second and third state values, respectively.

6. The method of claim 2 wherein the method of encoding is part of a method of passing data through a channel, which further comprises:

(g) dividing the encoded bit stream into the successive code words;

(h) dividing each of the successive code words from step (g) into the first and second code patterns;

(i) identifying the corresponding state variable from the first code pattern;

(j) mapping the first code pattern into the first portion of the successive data word;

(k) mapping the second code pattern into the second portion of the successive data word based on the corresponding state variable identified in step (i); and (l) combining the first and second portions of the successive data word.

7. An encoder for encoding successive data words into respective, successive code words which are concatenated to form an encoded bit stream, the encoder comprising:

an m-bit data word input for receiving the successive data words; an n-bit code word output;

a first encoder comprising a p-bit data word input coupled to the m-bit data word input, a u-bit code word output coupled to the n-bit code word output, and a state variable output;

a second encoder comprising a q-bit data word input coupled to the m-bit data word input, a v-bit code word output coupled to the n-bit code word output, and a state variable input coupled to the state variable output, where m, n, p, q, u and v are integer variables, p+q=m, u+v=n, and u<p; and a code implemented by the first and second encoders which limits a first number of consecutive same binary symbols appearing in a sequence of adjacent bit positions within the encoded bit stream on the n-bit code word output to a maximum of seven and limits a second number of consecutive same binary symbols appearing in subsequences of even and odd indexed bit positions in the encoded bit stream on the n-bit code word output to a maximum of five.

8. The encoder of claim 7 wherein m=16, n=17, p=8, q=8, u=7 and v=10.

9. The encoder of claim 7 wherein v=10 and the code defines first, second and third sets of unique v-bit code patterns, and wherein the first, second and third sets are each associated with a first state value, a second state value and a third state value.

10. The encoder of claim 9 wherein:

the first encoder comprises means for receiving a p-bit portion of each successive data word on the p-bit data word input and mapping the p-bit portion into a corresponding u-bit code pattern on the u-bit code word output and into a corresponding one of the first, second and third state values on the state variable output; and the second encoder comprises means for receiving a q-bit portion of each successive data word on the q-bit data word input and mapping the q-bit portion into a corresponding one of the v-bit code patterns on the v-bit code word output, wherein the corresponding v-bit code pattern is in the set that is associated with the state value on the state variable output.

11. The encoder of claim 7 wherein the encoder is part of a data channel, which also includes a decoder comprising:

an n-bit code word input for receiving successive code words;

an m-bit data word output;

a first decoder comprising a v-bit code word input coupled to the n-bit code word input, a q-bit data word output coupled to the m-bit data word output, and a state variable output;

a second decoder comprising a u-bit code word input coupled to the n-bit code word input, a p-bit data word output coupled to the m-bit data word output, and a state variable input coupled to the state variable output, where m, n, p, q, u and v are integer variables, p+q=m, u+v=n, and u<p; and wherein the first and second decoders are adapted to implement the code.

12. A disc drive storage channel comprising:

a transducer capable of communicating with a data storage disc; and write channel means coupled to the transducer for encoding successive data words into successive code words according to a selected code to form an encoded bit stream, which is then precoded and applied the transducer as a channel input, wherein the selected code constrains the successive code words such that there is a maximum possible run of seven consecutive same binary symbols in adjacent bit positions in the encoded bit stream and a maximum possible run of five consecutive same binary symbols in even indexed bit positions and odd indexed bit positions in the encoded bit stream.

13. The disc drive storage channel of claim 12 wherein:

the successive data words each comprise 16 bits;

the successive code words each comprise 17 bits;

the write channel means maps a first, 8-bit portion of each successive 16-bit data word into a first, 7-bit code pattern and a corresponding state value according to the selected code;

the write channel means maps a second, 8-bit portion of each successive 16-bit data word into a second, 10-bit code pattern as a function of the corresponding state value, according to the selected code; and the write channel means concatenates the first, 7-bit code pattern to the second, 10-bit code pattern to form each successive code word.

14. The disc drive storage channel of claim 12 and further comprising:

decoding means coupled to the transducer for decoding the successive code words received from the transducer into the successive data words according to the selected code.

* * * * *

UNITED STATES PATENT AND TRADEMARK OFFICE
CERTIFICATE OF CORRECTION

PATENT NO.    : 6,198,582 B1
DATED         : March 6, 2001
INVENTOR(S)   : Tsang et al.

It is certified that error appears in the above-identified patent and that said Letters Patent is hereby corrected as shown below:

Column 3,
Equation 5, change "c(D) = b(D)H(P)" to -- c(D) = b(D)H(D) --.

Column 8,
Equation 11, change "$2 = 2^8 = 256 \leq [N_u * t] = (87 * 3) = 261$" to
-- $2^p = 2^8 = 256 \leq [N_u * t] = (87 * 3) = 261$ --.

Column 9,
Table 2, line 12, change "18" to -- 1B --.
Table 2, line 65, change "S1" to -- 58 --.

Column 10,
Table 2, line 39, change "CF" to -- 0F --.
Table 2, line 59, change "S2  D8" to -- 18  S2 --.

Column 12,
Table 2, line 17, change "7E" to -- 7D --.

Table 4, Column 13,
Row 8X, change "2S6" to -- 286 --.

Table 4, Column 14,
Row CX, change "20E" to -- 2CE --.

Table 9, Column 17,
Change "Input: Th" to -- Input: TB --.

UNITED STATES PATENT AND TRADEMARK OFFICE
CERTIFICATE OF CORRECTION

PATENT NO. : 6,198,582 B1
DATED : March 6, 2001
INVENTOR(S) : Tsang et al.

It is certified that error appears in the above-identified patent and that said Letters Patent is hereby corrected as shown below:

Column 22,
Line 44, "an n-bit code word output;" should be a new paragraph.

Signed and Sealed this

Eleventh Day of March, 2003

JAMES E. ROGAN
*Director of the United States Patent and Trademark Office*